United States Patent
Reddi et al.

(10) Patent No.: US 12,373,692 B2
(45) Date of Patent: *Jul. 29, 2025

(54) CONTROLLED ADAPTIVE OPTIMIZATION

(71) Applicant: Google LLC, Mountain View, CA (US)

(72) Inventors: Sashank Jakkam Reddi, Jersey City, NJ (US); Sanjiv Kumar, Jericho, NY (US); Manzil Zaheer, Mountain View, CA (US); Satyen Chandrakant Kale, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,837

(22) Filed: Aug. 22, 2023

(65) Prior Publication Data

US 2023/0394310 A1    Dec. 7, 2023

Related U.S. Application Data

(63) Continuation of application No. 17/014,139, filed on Sep. 8, 2020, now Pat. No. 11,775,823, which is a continuation of application No. 16/657,356, filed on Oct. 18, 2019, now Pat. No. 10,769,529.

(60) Provisional application No. 62/775,016, filed on Dec. 4, 2018.

(51) Int. Cl.
    *G06N 3/08*    (2023.01)
    *G06N 3/045*   (2023.01)

(52) U.S. Cl.
    CPC ........... *G06N 3/08* (2013.01); *G06N 3/045* (2023.01)

(58) Field of Classification Search
    CPC ........ G06N 3/0455; G06N 3/045; G06N 3/08; G06N 3/0895; G06N 3/09; G06N 3/091; G06N 3/092; G06N 3/094; G06N 3/096; G06N 3/098; G06N 3/0985
    See application file for complete search history.

(56) References Cited

U.S. PATENT DOCUMENTS

| 9,723,144 | B1* | 8/2017 | Gao ............... H04M 3/5238 |
| 10,860,920 | B2* | 12/2020 | Gendron-Bellemare .......... G06N 3/006 |
| 10,984,308 | B2* | 4/2021 | Li ............... G06N 3/044 |
| 2017/0161640 | A1* | 6/2017 | Shamir ............ G06N 20/00 |

(Continued)

OTHER PUBLICATIONS

Agarwal et al., "Finding Approximate Local Minima for Nonconvex Optimization in Linear Time", arXiv:1611.01146v2, Nov. 4, 2016, 27 pages.

(Continued)

*Primary Examiner* — Paulinho E Smith
(74) *Attorney, Agent, or Firm* — DORITY & MANNING, P.A.

(57) ABSTRACT

Generally, the present disclosure is directed to systems and methods that perform adaptive optimization with improved convergence properties. The adaptive optimization techniques described herein are useful in various optimization scenarios, including, for example, training a machine-learned model such as, for example, a neural network. In particular, according to one aspect of the present disclosure, a system implementing the adaptive optimization technique can, over a plurality of iterations, employ an adaptive effective learning rate while also ensuring that the effective learning rate is non-increasing.

20 Claims, 4 Drawing Sheets

(56) References Cited

U.S. PATENT DOCUMENTS

| | | | | |
|---|---|---|---|---|
| 2018/0075347 | A1* | 3/2018 | Alistarh | G06N 3/084 |
| 2018/0107926 | A1* | 4/2018 | Choi | G06N 3/047 |
| 2018/0144242 | A1* | 5/2018 | Simard | G06N 3/045 |
| 2020/0012936 | A1* | 1/2020 | Lee | G06N 3/063 |

OTHER PUBLICATIONS

Allen-Zhu et al., "Variance Reduction for Faster Non-Convex Optimization", International Conference on Machine Learning, Jun. 19-24, 2016, New York City, New York, United States, 9 pages.

Ba et al., "Layer Normalization", arXiv: 1607.06450v1, Jul. 21, 2016, 14 pages.

Basu et al., "Qsparse-local-SGD: Distributed SGD with Quantization, Sparsification, and Local Computations", arXiv:1906.02367v2. Nov. 2, 2019, 50 pages.

Bernstein et al., "SignSGD: Compressed Optimisation for Non-Convex Problems", arXiv:1802.04434v3. Aug. 7, 2018, 25 pages.

Bonawitz et al., "Towards Federated Learning at Scale: System Design", Conference on Systems and Machine Learning (SysML), Mar. 31-Apr. 2, 2019, Stanford, CA, 15 pages.

Brownlee, "Gentle Introduction to the Adam Optimization Algorithm for Deep Learning", Machine Learning Mastery, Jul. 3, 2017.

Caldas et al., "Leaf: A Benchmark for Federated Settings", arXiv:1812.01097v1, Dec. 3, 2018, 6 pages.

Carmon et al., "Accelerated Methods for Non-Convex Optimization", arXiv:1611.00756v2, Feb. 2, 2017, 24 pages.

Charles et al., "On the Outsized Importance of Learning Rates in Local Update Methods", arXiv:2007.00878v1, Jul. 2, 2020, 69 pages.

Chiu et al., "Named Entity Recognition with Bidirectional LSTM-CNNs", arXiv:1511.08308v5, Jul. 19, 2016, 14 pages.

Clark, "Semi-Supervised Learning for NLP", Stanford University, Lecture 17, 77 pages.

Cohen et al., "Emnist: an extension of Minist to Handwritten Letter", arXiv:1702.05373v2, Mar. 1, 2017, 10 pages.

Defazio et al. "On the Ineffectiveness of Variance Reduced Optimization for Deep Learning", arXiv:1812.04529v1, Dec. 11, 2018, 10 pages.

Defazio et al., "Saga: A Fast Incremental Gradient Method with Support for Non-Strongly Convex Composite Objectives", Conference on Neural Information Processing Systems, Dec. 8-13, 2014, Montreal, Canada, 9 pages.

Duchi et al., "Adaptive Subgradient Methods for Online Learning and Stochastic Optimization", Journal of Machine Learning Research, vol. 12, Jul. 2011, pp. 2121-2159.

Ghadimi et al., "Mini-Batch Stochastic Approximation Methods for Nonconvex Stochastic Composite Optimization", arXiv:1308.6594v2, Sep. 5, 2013, 33 pages.

Ghadimi et al., "Stochastic First- and Zeroth-Order Methods for Nonconvex Stochastic Programming", arXiv:1309.5549v1, Sep. 22, 2013, 25 pages.

Goyal et al., "Accurate, Large Minibatch SGD: Training ImageNet in 1 Hour", arXiv: 1706.02677v1, Jun. 8, 2017, 12 pages.

Hazan et al., "Beyond Convexity: Stochastic Quasi-Convex Optimization", arXiv:1507.02030v3, Oct. 28, 2015, 23 pages.

He et al., "Deep Residual Learning for Image Recognition", Conference on Computer Vision and Pattern Recognition, Jun. 26-Jul. 1, 2016, Las Vegas, Nevada, United States, 9 pages.

Hinton et al., "Reducing the Dimensionality of Data with Neural Networks", Science, vol. 313, Jul. 28, 2006, pp. 504-507.

Hsieh et al., "The Non-IID Data Quagmire of Decentralized Machine Learning", arXiv:1910.00189v1, Oct. 2, 2019, 18 pages.

Hsu et al., "Measuring the Effects of Non-Identical Data Distribution for Federated Visual Classification", arXiv:1909.06335v1, Sep. 13, 2019, 5 pages.

Huang et al., "Densely Connected Convolutional Networks", arXiv:1608.06993v5, Jan. 28, 2018, 9 pages.

Ingerman et al., "Introducing TensorFlow Federated", Mar. 6, 2019, https://medium.com/tensorflow/introducing-tensorflow-federated-a4147aa20041, Retrieved on May 24, 2021, 5 pages.

Jin et al., "How to Escape Saddle Points Efficiently", arXiv:1703.00887v1, Mar. 2, 2017, 35 pages.

Johnson et al., "Accelerating Stochastic Gradient Descent using Predictive Variance Reduction", Conference on Neural Information Processing Systems, Dec. 5-10, 2013, Lake Tahoe, Nevada, United States, 9 pages.

Kairouz et al., "Advances and Open Problems in Federated Learning", arXiv:1912.04977v1, Dec. 10, 2019, 105 pages.

Karimireddy et al., "Scaffold: Stochastic Controlled Averaging for On-Device Federated Learning", arXiv:1910.06378v1, Oct. 14, 2019, 30 pages.

Keskar et al., "Improving Generalization Performance by Switching from Adam to SGD", arXiv:1712.07628v1, Dec. 20, 2017.

Khaled et al., "First Analysis of Local GD on Heterogeneous Data", arXiv:1909.04715v2, Mar. 18, 2020, 11 pages.

Kingma et al. "Adam: A Method for Stochastic Optimization", 2015, 15 pages.

Krizhevsky et al., "Learning Multiple Layers of Features from Tiny Images", Technical Report, Citeseer, Apr. 8, 2009, 60 pages.

Li et al., "Federated Learning: Challenges, Methods, and Future Directions", arXiv:1908.07873v1, Aug. 21, 2019, 21 pages.

Li et al., "On the Convergence of FedAvg on Non-IID Data", arXiv:1907.02189v2, Oct. 8, 2019, 26 pages.

Li et al., "On the Convergence of Stochastic Gradient Descent with Adaptive Stepsizes", arXiv: 1805.08114v2, May 31, 2018, 13 pages.

Li et al., "Pachinko Allocation: DAG-Structured Mixture Models of Topic Correlations", International Conference on Machine Learning, Jun. 25-29, 2006, Pittsburgh, Pennsylvania, United States, 9 pages.

Li et al., "Stochastic Variance Reduced Optimization for Nonconvex Sparse Learning", Jun. 19-24, 2016, New York City, New York, United States, 9 pages.

Luo et al., "Adaptive Gradient Methods with Dynamic Bound of Learning Rate", International Conference on Learning Representations, May 6-9, 2019, New Orleans, Louisiana, United States, 21 pages.

Luong et al., "Stanford Neural Machine Translation Systems for Spoken Language Domain", International Workshop on Spoken Language Translation, Dec. 3-4, 2015, Da Nang, Vietnam, 4 pages.

Ma et al., "End-To-End Sequence Labeling via Bi-directional LSTM-CNNs-CRF", arXiv:1603.01354v5, May 29, 2016, 12 pages.

Martens et al., "Deep learning via Hessian-free optimization", Conference on Learning Theory, Jun. 27-29, 2010, Haifa, Israel, 8 pages.

Martens et al., "Optimizing Neural Networks with Kronecker-factored Approximate Curvature"; arXiv:1503.05671v7, Jun. 8, 2020, 58 pages.

McMahan et al., "Adaptive Bound Optimization for Online Convex Optimization", Conference on Learning Theory, Jun. 27-29, 2010, Haifa, Israel, 15 pages,.

McMahan et al., "Communication-Efficient Learning of Deep Networks from Decentralized Data", International Conference on Artificial Intelligence and Statistics (AISTATS), Apr. 20-22, 2017, Ft. Lauderdale, Florida, United States, 10 pages.

Nesterov, "Introductory Lectures on Convex Optimization: A Basic Course", Applied Optimization, vol. 87, Kluwer Academic Publishers, Massachusetts, 2004, 253 pages.

Reddi et al., "A Generic Approach for Escaping Saddle points", arXiv:1709.01434v1. Sep. 5, 2017, 18 pages.

Reddi et al., "Fast Incremental Method for Nonconvex Optimization", arXi: 1603.06159v1, Mar. 19, 2016, 14 pages.

Reddi et al., "Fast Stochastic Methods for Nonsmooth Nonconvex Optimization", arXiv:1605.06900v1, May 23, 2016, 24 pages.

Reddi et al., "On the Convergency of Adam and Beyond", arXiv41 1904v1, Apr. 19, 2019, 23 pages.

Reddi et al., "Stochastic Variance Reduction for Nonconvex Optimization", arXiv:1603.06160v2, Apr. 4, 2016, 26 pages.

Robbins et al., "A Stochastic Approximation Method", The Annals of Mathematical Statistics, vol. 22, No. 3. Sep. 1951, pp. 400-407.

(56) References Cited

OTHER PUBLICATIONS

Sahu et al., "On the Convergence of Federated Optimization in Heterogeneous Networks", arXiv: 1812.06127v1, Dec. 14, 2018, 12 pages.
Sennrich et al., "Neural Machine Translation of Rare Words with Subword Units", arXiv:1508.07909v5, Jun. 10, 2016, 11 pages.
Stefan, "Neural Machine Translation system for English to Vietnamese", https://github.com/stefan-it/nmt-en-vi, retrieved on May 27, 2021, 5 pages.
Stich et al., "The Error-Feedback Framework: Better Rates for SGD with Delayed Gradients and Compressed Communication", arXiv:1909.05350v1, Sep. 11, 2019, 29 pages.
Stich, "Local SGD Converges Fast and Communicates Little", International Conference on Learning Representations, May 6-9, 2019, New Orleans, Louisiana, United States, 17 pages.
Sutskever et al., "On the Importance of Initialization and Momentum in Deep Learning", International Conference on Machine Learning, Jun. 16-23, 2013, Atlanta, Georgia, United States, 9 pages.
Szegedy et al., "Inception-v4, Inception-ResNet and the Impact of Residual Connections on Learning", arXiv: 160207261v2, Aug. 23, 2016, 12 pages.
Tensorflow Federated Authors, "TensorFlow Federated Stack Overflow Dataset", 2019, https://www.tensorflow.org/federated/apidocs/python/tff/simulation/datasets/stackoverflow/load_data, Retrieved on May 24, 2021, 3 pages.
Tieleman et al., "RmsProp: Divide the Gradient by a Running Average of its Recent Magnitude", Coursera: Neural Networks for Machine Learning, vol. 4, Issue 2, Oct. 2012, pp. 26-31.
Tong et al., "Effective Federated Adaptive Gradient Methods with Non-IID Decentralized Data", arXiv:2009.06557v2, Dec. 22, 2020, 42 pages.
Vaswani et al., "Attention is All you Need", Conference on Neural Information Processing Systems, Dec. 4-9, 2017, Long Beach, California, United States, 11 pages.
Vinyals et al., "Krylov Subspace Descent for Deep Learning", arXiv:1111.4259v1, Nov. 18, 2011, 11 pages.
Wang et al., "Adaptive Federated Learning in Resource Constrained Edge Computing Systems", arXiv:1804.05271v3, Feb. 17, 2019, 20 pages.
Wang et al., "Cooperative SGD: A Unified Framework for the Design and Analysis of Communication-Efficient SGD Algorithms", arXiv:1808.07576v2, Oct. 19, 2018, 23 pages.
Wang et al., "Cross-Type Biomedical Named Entity Recognition with Deep Multi-Task Learning", arXiv:1801.09851v4, Oct. 8, 2018, 7 pages.
Ward et al., "AdaGrad Stepsizes: Sharp Convergence over Nonconvex Landscapes, from any Initialization", arXiv:1806.01811v5, Jun. 21, 2018, 17 pages.
Wu et al., "3D ShapeNets: A Deep Representation for Volumetric Shapes", Conference on Computer Vision and Pattern Recognition, Jun. 7-12, 2015, Boston, Massachusetts, United States, 9 pages.
Wu et al., "Global Convergence of Adaptive Gradient Methods for an Over-parameterized Neural Network", arXiv:1902.07111v2, Oct. 19, 2019, 27 pages.
Wu et al., "Group Normalization", European Conference on Computer Vision, Sep. 8-14, 2018, Munich, Germany, 17 pages.
Xie et al., "Local AdaAlter: Communication-Efficient Stochastic Gradient Descent with Adaptive Learning Rates", arXiv:1911.09030v1, Nov. 20, 2019, 18 pages.
Yu et al., "Parallel Restarted SGD with Faster Convergence and Less Communication: Demystifying Why Model Averaging Works for Deep Learning", AAAI Conference on Artificial Intelligence, Jan. 27-Feb. 1, 2019, Honolulu, Hawaii, United States, pp. 5693-5700.
Zaheer et al. "Adaptive Methods for Nonconvex Optimization", Conference on Neural Information Processing Systems, 2018, 11 pages.
Zaheer et al., "Deep Sets", arXiv:1703.06114v3, Apr. 14, 2018, 29 pages.
Zeiler, "Adadelta: An Adaptive Learning Rate Method", arXiv:1212.5701v1, Dec. 22, 2012, 6 pages.
Zhang et al., "Lookahead Optimizer: k steps forward, 1 step back", Conference on Neural Information Processing Systems, Dec. 8-14, 2019, Vancouver, Canada, 12 pages.
Zhang et al., "Why Adam Beats SGD for Attention Models", arXiv:1912.03194v1. Dec. 6, 2019, 20 pages.
Zinkevich et al., "Parallelized Stochastic Gradient Descent", Conference on Neural Information Processing Systems, Dec. 6-11, 2010, Vancouver, Canada, 9 pages.
McMahan et al., "Federated Learning of Deep Networks using Model Averaging", arXiv:1602.05629v1, 11 pages, Feb. 17, 2016.

* cited by examiner

CONTROLLED ADAPTIVE OPTIMIZATION

RELATED APPLICATIONS

This application is a continuation of U.S. application Ser. No. 17/014,139 having a filing date of Sep. 8, 2020 which is a continuation of U.S. application Ser. No. 16/657,356 having a filing date of Oct. 18, 2019, now U.S. Pat. No. 10,769,529 which claims priority to U.S. Provisional Patent Application No. 62/775,016 filed Dec. 4, 2018. Applicant claims priority to and the benefit of each of such applications and incorporate all such applications herein by reference in its entirety.

FIELD

The present disclosure relates generally to systems and methods to solve optimization problems, such as training a machine-learned model. More particularly, the present disclosure relates to controlled adaptive optimization techniques with improved performance such as improved convergence properties.

BACKGROUND

Machine-learned models such as artificial neural networks typically include a number of parameters. In various machine learning techniques, the final values of the parameters are learned through an iterative training process which updates the parameters at each of a plurality of training iterations. For example, at each iteration, the performance of the model relative to a set (e.g., a "minibatch") of training data is evaluated using a loss function. The parameters can be updated based on the performance of model as evaluated by the loss function.

The degree or amount by which the parameters of the model are updated at each iteration can be controlled by or otherwise performed in accordance with an effective learning rate. For example, a relatively smaller effective learning rate will typically result in relatively smaller changes to the values of the parameters, while a relatively larger effective learning rate will typically result in relatively larger changes to the values of the parameters at that iteration.

Stochastic gradient descent (Sgd) is one of the dominant methods used today to train deep neural networks. This method iteratively updates the parameters of a model by moving them in the direction of the negative gradient of the loss evaluated on a minibatch of training data.

Variants of Sgd that scale coordinates of the gradient by square roots of some form of averaging of the squared coordinates in the past gradients have been particularly successful, because they automatically adjust the effective learning rate on a per-feature basis. The first popular algorithm in this line of research is Adagrad which can achieve significantly better performance compared to vanilla Sgd when the gradients are sparse, or in general small.

In particular, Adagrad uses a sum of the squares of all the past gradients in the update, thereby forcing the effective learning rate at each iteration to be strictly less than or equal to the effective learning rate used at the previous iteration. Although Adagrad works well for sparse settings, its performance has been observed to deteriorate in settings where the loss functions are non-convex and gradients are dense due to rapid decay of the effective learning rate in these settings. Thus, Adagrad struggles in non-convex settings because its effective learning rate is never permitted to increase and, therefore, the gradient descent may become "stuck" at a local, but not global optimum. These problems are especially exacerbated in high dimensional problems arising in deep learning.

To tackle this issue, several other adaptive optimization techniques, such as RMSprop, Adam, Adadelta, Nadam, etc., have been proposed which mitigate the rapid decay of the effective learning rate through use of the exponential moving averages of squared past gradients, essentially limiting the reliance of the update to only the past few gradients. While these algorithms have been successfully employed in several practical applications, they have also been observed to not converge in certain settings such as sparse settings. In particular, it has been observed that in these settings some minibatches provide large gradients but only quite rarely, and while these large gradients are quite informative, their influence dies out rather quickly due to the exponential averaging, thus leading to poor convergence. Thus, Adam and other adaptive techniques that employ multiplicative updates to control the learning rate can struggle in sparse settings in which small gradients undesirably dominate the moving average.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for optimizing machine-learned models that provides improved convergence properties. For each of one or more iterations, the method includes determining, by one or more computing devices, a gradient of a loss function that evaluates a performance of a machine-learned model that comprises a plurality of parameters. For each of one or more iterations, the method includes determining, by the one or more computing devices, a current learning rate control value based on the gradient of the loss function. The current learning rate control value equals a most recent learning rate control value minus an update value. A magnitude of the update value is a function of the gradient of the loss function but not the most recent learning rate control value. A polarity of the update value is a function of both the gradient of the loss function and the most recent learning rate control value. For each of one or more iterations, the method includes determining, by the one or more computing devices, a current effective learning rate based at least in part on the current learning rate control value. For each of one or more iterations, the method includes determining, by the one or more computing devices, an updated set of values for the plurality of parameters of the machine-learned model based at least in part on the gradient of the loss function and according to the current effective learning rate.

Another example aspect of the present disclosure is directed to a computing system that includes one or more processors and one or more non-transitory computer-readable media that store instructions that, when executed by the one or more processors, cause the one or more processors to perform operations. For each of one or more iterations, the operations include determining a gradient of a loss function that evaluates a performance of a machine-learned model that comprises a plurality of parameters. For each of one or more iterations, the operations include determining a current learning rate control value based on the gradient of the loss function. The current learning rate control value equals a most recent learning rate control value minus an update value. A magnitude of the update value is equal to a square of the gradient of the loss function times a scaling coefficient. A polarity of the update value is a function of both the gradient of the loss function and the most recent learning rate control value. For each of one or more iterations, the operations include determining a current effective learning rate based at least in part on the current learning rate control value. For each of one or more iterations, the operations include determining an updated set of values for the plurality of parameters of the machine-learned model based at least in part on the gradient of the loss function and according to the current effective learning rate.

Another example aspect of the present disclosure is directed to one or more non-transitory computer-readable media that store instructions that, when executed by one or more processors, cause the one or more processors to perform operations. For each of one or more iterations, the operations include determining a gradient of a loss function that evaluates a performance of a machine-learned model that comprises a plurality of parameters. For each of one or more iterations, the operations include determining a current learning rate control value based on the gradient of the loss function. The current learning rate control value equals a most recent learning rate control value minus an update value. The update value is equal to a square of the gradient of the loss function multiplied by a sign function applied to the most recent learning rate control value minus the square of the gradient of the loss function and multiplied by a scaling coefficient that is equal to one minus an update scaling parameter. For each of one or more iterations, the operations include determining, by the one or more computing devices, a current effective learning rate based at least in part on the current learning rate control value. For each of one or more iterations, the operations include updating at least one of the plurality of parameters of the machine-learned model based at least in part on the gradient of the loss function and according to a current effective learning rate that is a function of the current learning rate control value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
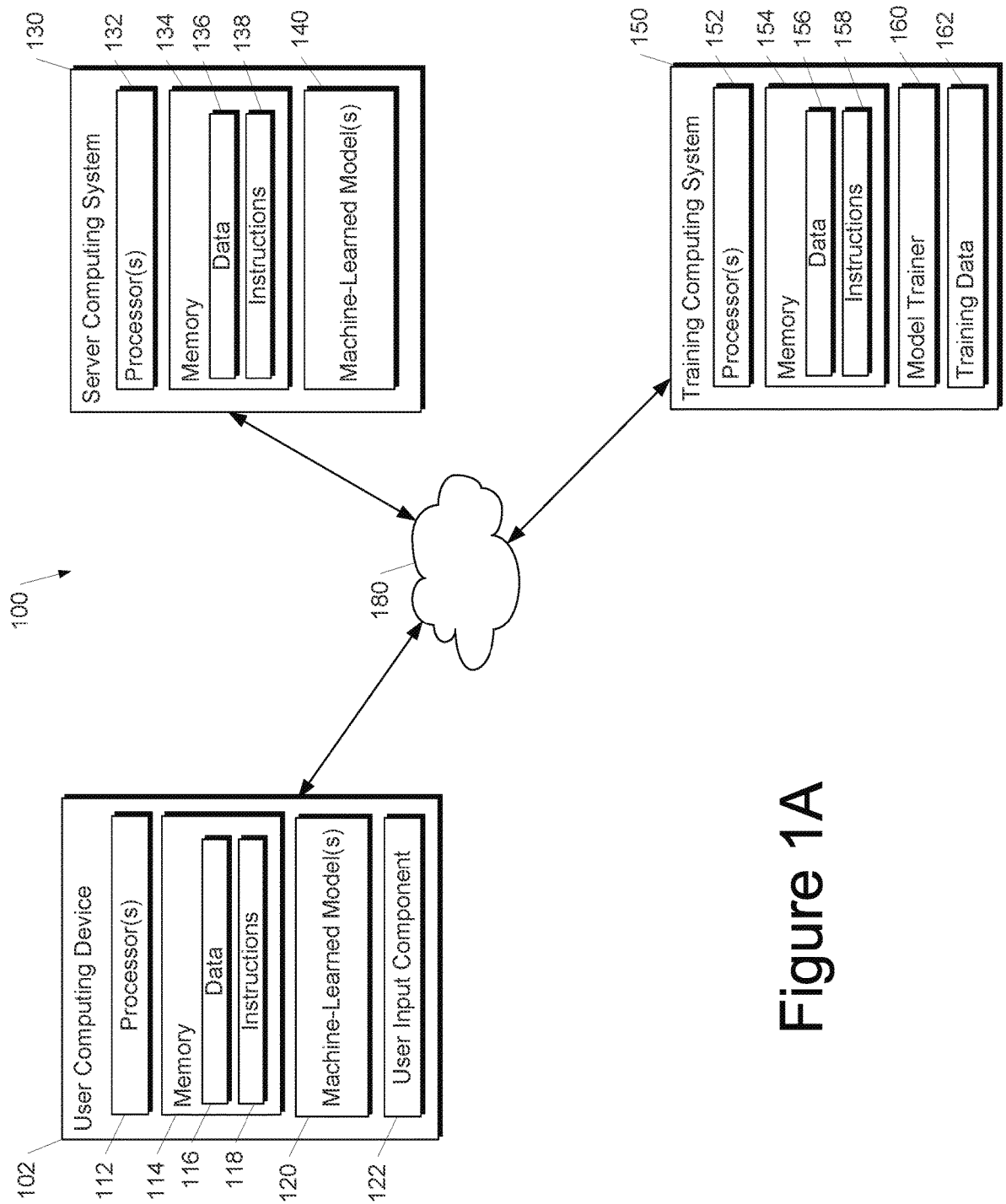
FIG. 1A depicts a block diagram of an example computing system according to example embodiments of the present disclosure.

Reference numerals that are repeated across plural figures are intended to identify the same features or components in various implementations.

DETAILED DESCRIPTION

Overview

Generally, the present disclosure is directed to systems and methods that perform controlled adaptive optimization with improved performance (e.g., improved convergence properties). In particular, aspects of the present disclosure provide iterative gradient descent techniques in which, at each of a plurality of iterations, an effective learning rate is permitted to either increase or decrease relative to a previous iteration, but in a controlled fashion, such that unduly rapid decay or increase in the effective learning rate does not occur.

More particularly, according to one aspect of the present disclosure, a system implementing the adaptive optimization techniques described herein can, over a plurality of iterations, perform additive updates to a learning rate control value that controls the effective learning rate. The effective learning rate can be a function of and inversely correlated to the learning rate control value. In particular, at each iteration, a current learning rate control value can be equal to a most recent learning rate control value minus an update value.

According to aspects of the present disclosure, a magnitude of the update value can be a function of the gradient of the loss function but not a most recent learning rate control value while a polarity of the update value can be a function of both the gradient of the loss function and the most recent learning rate control value. For example, the magnitude of the update value can be equal to a square of the gradient of the loss function times a scaling coefficient while the polarity of the update can be equal to a sign function applied to the most recent learning rate control value minus the squared gradient. Thus, in some implementations, an update value can be controlled to be equal to plus or minus the magnitude of the squared gradient of the loss function times a scaling coefficient. In such fashion, iteration-over-iteration changes to the effective learning rate can be either positive or negative but can be controlled to prevent overly-significant changes to the effective learning rate.

As a result, the optimization techniques described herein can provide the benefits of use of an adaptive effective learning rate, while avoiding certain problems exhibited by existing adaptive optimization techniques. For example, the adaptive optimization techniques described herein may be particularly advantageous in settings where the loss function is non-convex and/or the gradients are sparse, or in general small.

More particularly, as indicated above, because the Adagrad technique forces the effective learning rate at each iteration to be strictly less than or equal to the effective learning rate used at the previous iteration, the Adagrad technique has been observed to deteriorate in settings where the loss functions are non-convex and gradients are dense due to rapid decay of the effective learning rate in these settings. In contrast to the Adagrad technique, the techniques described herein permit the effective learning rate to either increase or decrease relative to a previous iteration and, therefore, do not exhibit rapid decay of the effective learning rate, which results in improved performance in non-convex settings.

In addition, as indicated above, Adam and other adaptive techniques that employ multiplicative updates to control the learning rate can struggle in sparse settings in which small gradients undesirably dominate the moving average. In contrast to the Adam technique, the techniques described herein employ additive updates that control the impact of the update to the learning rate control value, thereby preventing overly-significant changes to the effective learning rate. For example, in some implementations of the present disclosure, a very small gradient would result in a correspondingly small change to the learning rate control value, while, if the Adam technique were applied, the very small gradient would have an outsized impact on the learning rate control value.

The adaptive optimization techniques described herein are useful in various optimization scenarios, including, for example, training a machine-learned model such as, for example, a neural network. However, the adaptive optimization techniques described herein can be applied to perform optimization on any function and in any setting. Furthermore, the systems and methods of the present disclosure provide guaranteed convergence, while also reducing the number of hyperparameters, converging faster than certain existing techniques, and providing superior generalization capacity.

Faster and guaranteed convergence, as provided by the techniques described herein, has a number of technical benefits. As examples, faster convergence means that the training operations require less memory usage, less processor usage, and decreased peak processor requirements. Guaranteed convergence provides more certainty and efficiency in scheduling multiple jobs. In particular, failure of the model training process to converge will result in lack of a model to deploy. Lack of guaranteed convergence means that the training process cannot be automated and that the training process will need to be manually monitored to confirm convergence. As such, the lack of guaranteed convergence can cause major problems in active product offerings where models are periodically re-trained and deployed in an automated fashion. In particular, failure of model training to converge in such scenarios can break processing pipelines and/or cause system downtime.

The optimization techniques described herein can also be used in specific consumer products such as machine learning as a service products. Machine learning tools, such as the optimization techniques described herein, are increasingly being offered as consumable products (e.g., as part of a managed cloud service). Thus, the optimization techniques described herein can be provided as a product and service which is a specific example use of the techniques described herein.

Thus, aspects of the present disclosure are directed to new algorithms (e.g., the "Yogi" algorithm described herein) for achieving adaptivity in stochastic gradient descent. The present disclosure also shows convergence results with increasing minibatch size. The analysis also highlights the interplay between level of "adaptivity" and convergence of the algorithm.

The Appendix to U.S. Provisional Patent Application No. 62/775,016, which is incorporated into and forms a portion of this disclosure, provides extensive example empirical experiments for Yogi and shows that it performs better than Adam in many state-of-the-art machine learning models. The example experiments also demonstrate that Yogi achieves similar, or better, results to best performance reported on these models with relatively little hyperparameter tuning.

Example implementations of aspects of the present disclosure will now be discussed in further detail. The example algorithms and other mathematical expressions provided below are examples of possible ways to implement aspects of the present disclosure. The systems and methods of the present disclosure are not limited to the example implementations described below.

Example Notation and Problem Formulation

Example aspects of the present disclosure are applicable to stochastic optimization problems of the form:

$$\min_{x \in \mathbb{R}^d} f(x) := E_{s \sim \mathbb{P}}[\ell(x, s)], \quad (1)$$

where $\ell$ is a smooth (possibly non-convex) function and $\mathbb{P}$ is a probability distribution on the domain $S \subset \mathbb{R}^k$.

Optimization problems of this form arise naturally in machine learning where x are model parameters, $\ell$ is the loss function and $\mathbb{P}$ is an unknown data distribution. Stochastic gradient descent (Sgd) is the dominant method for solving such optimization problems, especially in non-convex settings. Sgd iteratively updates the parameters of the model by moving them in the direction of the negative gradient computed on a minibatch scaled by step length, typically referred to as learning rate. One has to decay this learning rate as the algorithm proceeds in order to control the variance in the stochastic gradients computed over a minibatch and thereby, ensure convergence. Hand tuning the learning rate decay in Sgd is often painstakingly hard. To tackle this issue, several methods that automatically decay the learning rate have been proposed. The first prominent algorithms in this line of research is Adagrad, which uses a per-dimension learning rate based on squared past gradients. Adagrad achieved significant performance gains in comparison to Sgd when the gradients are sparse.

Although Adagrad has been demonstrated to work well in sparse settings, it has been observed that its performance, unfortunately, degrades in dense and non-convex settings. This degraded performance is often attributed to the rapid decay in the learning rate when gradients are dense, which is often the case in many machine learning applications. Several methods have been proposed in the deep learning literature to alleviate this issue. One such popular approach is to use gradients scaled down by square roots of exponential moving averages of squared past gradients instead of cumulative sum of squared gradients in Adagrad. The basic intuition behind these approaches is to adaptively tune the learning rate based on only the recent gradients; thereby, limiting the reliance of the update on only the past few gradients. RMSprop, Adam, Adadelta are just few of many methods based on this update mechanism.

Exponential moving average (EMA) based adaptive methods are very popular in the deep learning community. These methods have been successfully employed in plethora of applications. Adam and RMSprop, in particular, have been instrumental in achieving state-of-the-art results in many applications. At the same time, there have also been concerns about their convergence and generalization properties, indicating that despite their widespread use, understanding of these algorithms is still very limited. Recently, it has been shown that EMA-based adaptive methods may not converge to the optimal solution even in simple convex settings when a constant minibatch size is used. This analysis relied on the fact that the effective learning rate (in this case, the learning rate parameter divided by square root of an exponential moving average of squared past gradients, optionally plus an adaptivity control value) of EMA methods can potentially increase over time in a fairly quick manner, and for convergence it is important to have the learning rate decrease over iterations, or at least have controlled increase. This issue persists even if the learning rate parameter is decreased over iterations.

Example Notation

For any vectors a, b$\in \mathbb{R}^d$, $\sqrt{a}$ is used for element-wise square root, $a^2$ is used for element-wise square, and a/b is used to denote element-wise division. For any vector $\theta_i \in \mathbb{R}^d$, either $\theta_{i,j}$ or $[\theta_i]_j$ are used to denote its $j^{th}$ coordinate where $j \in [d]$.

Example Preliminaries

The following discussion assumes function $\ell$ is L-smooth, i.e., there exists a constant L such that $\|\nabla \ell(x,s) - \nabla \ell(y,s)\| \leq L\|x-y\|, \forall x,y \in \mathbb{R}^d$ and $s \in \mathcal{S}$.

Furthermore, also assume that the function $\ell$ has bounded gradient i.e., $\|\nabla[\ell f(x, s)]_i\| \leq G$ for all $x \in \ell^d$, $s \in \mathcal{S}$ and $i \in [d]$. Note that these assumptions trivially imply that expected loss $f$ defined in (1) is L-smooth, i.e., $\|\nabla f(x) - \nabla f(y)\| \leq L\|x-y\|$ for all $x,y \in \mathbb{R}^d$. The following bound on the variance in stochastic gradients is also assumed: $\mathbb{E} \|\nabla \ell(x,s) - \nabla f(x)\|^2 \leq \sigma^2$ for all $x \in \mathbb{R}^d$. Such assumptions are typical in the analysis of stochastic first-order methods.

Convergence rates of some popular adaptive methods for the above classes of functions are analyzed. Following several previous works on non-convex optimization, $\|\nabla f(x)\|^2 \leq \delta$ is used to measure the "stationarity" of the iterate x; such a solution is referred to as δ-accurate solution. Here, δ is used instead of standard ε in optimization and machine learning literature since ε symbol is reserved for description of some popular adaptive methods like Adam.

In contrast, algorithms in the convex setting are typically analyzed with the suboptimality gap, $f(x)-f(x^*)$, where $x^*$ is an optimal point, as the convergence criterion. However, it is not possible to provide meaningful guarantees for such criteria for general non-convex problems due to the hardness of the problem. Note also that adaptive methods have historically been studied in online convex optimization framework where the notion of regret is used as a measure of convergence. This naturally gives convergence rates for stochastic convex setting too. Portions of the discussion provided herein focus on the stochastic non-convex optimization setting since that is often the right model for risk minimization in machine learning problems.

To simplify the exposition of results described herein, the following example measure of efficiency for a stochastic optimization algorithm is defined:

Definition 1 Stochastic first-order (SFO) complexity of an algorithm is defined as the number of gradients evaluations of the function $\ell$ with respect to its first argument made by the algorithm.

As applied to first order methods, the efficiency of the algorithms can be measured in terms of SFO complexity to achieve a δ—accurate solution. In certain portions of the discussion contained herein, the dependence of SFO complexity on L, G, $\|x^0-x^*\|^2$ and $f(x^0)-f(x^*)$ is hidden for a clean comparison. Stochastic gradient descent (Sgd) is one of the simplest algorithms for solving (1). The update at the $t^{th}$ iteration of Sgd is of the following form:

$x_{t+1} = x_t - \eta_t g_t$ (SgD)

where $g_t = \nabla \ell(x_t, s_t)$ and s t is a random sample drawn from the distribution $\mathbb{P}$. When the learning rate is decayed as $\eta_t = 1/\sqrt{t}$, one can obtain the following well-known result:

Corollary 1 The SFO complexity of Sgd to obtain a δ-accurate solution is $O(1/\delta^2)$.

In practice, it is often tedious to tune the learning rate of Sgd because rapid decay in learning rate like $\eta_t = 1/\sqrt{t}$ typically hurts the empirical performance in non-convex settings. The next section investigates adaptive methods which at least partially circumvent this issue.

Example Algorithmic Approaches

This section discusses adaptive methods and analyzes their convergence behavior in the example non-convex setting. In particular, two algorithms are discussed: Adam and an example proposed method, Yogi.

Algorithm 1 Adam

---
Input: $x_1 \in \mathbb{R}^d$, learning rate $\{\eta_t\}_{t=1}^T$, decay parameters $0 \leq \beta_1, \beta_2 \leq 1, \varepsilon > 0$
1:  Set $m_0 = 0, v_0 = 0$
2:  for t = 1 to T
3:      Draw a sample $s_t$ from $\mathbb{P}$.
4:      Compute $g_t = \nabla \ell(x_t, s_t)$.
5:      $m_t = \beta_1 m_{t-1} + (1 - \beta_1) g_t$
6:      $v_t = v_{t-1} - (1 - \beta_2)(v_{t-1} - g_t^2)$
7:      $x_{t+1} = x_t - \eta_t m_t/(\sqrt{v_t} + \varepsilon)$
8:  end for
---

Example Discussion of the Adam Algorithm

Adam is an adaptive method based on EMA, which is popular among the deep learning community. EMA based adaptive methods were initially inspired from Adagrad and were proposed to address the problem of rapid decay of learning rate in Adagrad. These methods scale down the gradient by the square roots of EMA of past squared gradients.

The pseudocode for Adam is provided in Algorithm 1. The terms $m_t$ and $v_t$ in Algorithm 1 are EMA of the gradients and squared gradients respectively. Note that here, for the sake of clarity, the debiasing step used in the original paper is removed but the results also apply to the debiased version. A value of $\beta_1=0.9$, $\beta_2=0.999$ and $\varepsilon=10^{-8}$ is typically recommended in practice. The ε parameter, which was initially designed to avoid precision issues in practical implementations, is often overlooked. However, it has been observed that very small ε in some applications has also resulted in performance issues, indicating that it has a role to play in convergence of the algorithm. Intuitively ε captures the amount of "adaptivity" in Adam: larger values of ε imply weaker adaptivity since ε dominates $v_t$ in this case.

Recent academic work has shown the non-convergence of Adam in simple online convex settings, assuming constant minibatch sizes. These results naturally apply to the non-convex setting too. It is, however, interesting to consider the case of Adam in non-convex setting with increasing batch sizes.

To this end, the following convergence result for non-convex setting is proven. For the sake of simplicity, the present disclosure analyzes the case where $\beta_1=0$, which is typically referred to as RMSprop. However, the provided analysis extends to the general case as well.

Theorem 1 Let $\eta_t=\eta$ for all $t \in [T]$. Furthermore, assume that $\varepsilon$, $\beta_2$ and $\eta$ are chosen such that the following conditions satisfied:

$$\eta \leq \frac{\varepsilon}{2L}$$

and $$1 - \beta_2 \leq \frac{\varepsilon^2}{16G^2}.$$

Then for $x_t$ generated using Adam (Algorithm 1), we have the following bound $$\mathbb{E}\|\nabla f(x_a)\|^2 \leq O\left(\frac{f(x_1) - f(x^*)}{\eta T} + \sigma^2\right),$$

where $x^*$ is an optimal solution to the problem in (1) and $x_a$ is an iterate uniformly randomly chosen from $\{x_1, \ldots, x_T\}$.

The above result shows that Adam achieves convergence to stationarity within the constant factor of $O(\sigma^2)$ for constant learning rate $\eta$, which is similar to the result for Sgd with constant learning rate. An immediate consequence of this result is that increasing minibatch size can improve convergence. Specifically, the above result assumes a minibatch size of 1. Suppose instead that a minibatch size of b is used, and in each iteration of Adam we average b stochastic gradients computed at the b samples in the minibatch. Since the samples in the minibatch are independent, the variance of the averaged stochastic gradient is at most $$\frac{\sigma^2}{b},$$

a factor b lower than a single stochastic gradient. Plugging this variance bound into the bound of Theorem 1, it can be concluded that increasing the minibatch size decreases the limiting expected stationarity by a factor of b. Specifically, the following result is obtained which is an immediate consequence of Theorem 1 with fixed batch size b and constant learning rate.

Corollary 2 For $x_t$ generated using Adam with constant $\eta$ (and parameters from Theorem 1), we have $$\mathbb{E}[\|\nabla f(x_a)\|^2] \leq O\left(\frac{1}{T} + \frac{1}{b}\right),$$

where $x_a$ is an iterate uniformly randomly chosen from $\{x_1, \ldots, x_T\}$.

The above results shows that Adam obtains a point that has bounded stationarity in expectation i.e., $\mathbb{E}[\|\nabla f(x_a)\|^2] \leq O(1/b)$ as $T \to \infty$. Note that this does not necessarily imply that the $x_a$ is close to a stationary point but a small bound is typically sufficient for many machine learning applications. To ensure good SFO complexity, we need $b=\Theta(T)$, which yields the following important corollary.

Corollary 3 Adam with $b=\Theta(T)$ and constant $\eta$ (and parameters from Theorem 1), we obtain $\mathbb{E}[\|\nabla f(x_a)\|^2] \leq O(1/T)$ and the SFO complexity for achieving a $\delta$-accurate solution is $O(1/\delta^2)$.

The result simply follows by using batch size $b=\Theta(T)$ and constant $\eta$ in Theorem 1. Note that this result can be achieved using a constant learning rate and $\beta_2$.

Algorithm 2 Yogi

---

Input: $x_1 \in \mathbb{R}^d$, learning rate $\{\eta_t\}_{t=1}^T$, decay parameters $0 \leq \beta_1, \beta_2 \leq 1$, $\varepsilon > 0$ 1:   Set $m_0 = 0$, $v_0 = 0$
2:   for $t = 1$ to T
3:     Draw a sample $s_t$ from $\mathbb{P}$.
4:     Compute $g_t = \nabla \ell(x_t, s_t)$.
5:     $m_t = \beta_1 m_{t-1} + (1 - \beta_1)g_t$
6:     $v_t = v_{t-1} - (1 - \beta_2)\text{sign}(v_{t-1} - g_t^2)g_t^2$
7:     $x_{t+1} = x_t - \eta_t m_t/(\sqrt{v_t} + \varepsilon)$
8:   end for Example Discussion of Yogi Algorithm One important element underlying Adam is to use an adaptive gradient while ensuring that the learning rate does not decay quickly. To achieve this, Adam uses an EMA which is, by nature, multiplicative. This leads to a situation where the past gradients are forgotten in a fairly fast manner. This can especially be problematic in sparse settings where gradients are rarely nonzero. An alternate approach to attain the same goal as Adam is through additive updates. To this end, aspects of the present disclosure are directed to a simple additive adaptive method, Yogi, for optimizing stochastic non-convex optimization problems.

Algorithm 2 provides the pseudocode for Yogi. Note that the update is in some respects similar to Adagrad except, for example, for the use of $\text{sign}(v_{t-1}-g_t^2)$ in Yogi. Similar to Adam, $\varepsilon$ controls the amount of adaptivity in the method. The difference with Adam is in the update of $v_t$. To gain more intuition for Yogi, let us compare its update rule with that of Adam. The quantity $v_t-v_{t-1}$ is $-(1-\beta_2)\text{sign}(v_{t-1}-g_t^2) g_t^2$ in Yogi as opposed to $-(1-\beta_2)(v_{t-1}-g_t^2)$ in Adam.

An important property of Yogi, which is common with Adam, is that the difference of $v_t$ and $v_{t-1}$ depends only on $v_{t-1}$ and $g_t^2$. However, unlike Adam, the magnitude of this difference in Yogi only depends on $g_t^2$ as opposed to dependence on both $v_{t-1}$ and $g_t^2$ in Adam. Note that when $v_{t-1}$ is much larger than $g_t^2$, Adam and Yogi increase the effective learning rate. However, in this case it can be seen that Adam can rapidly increase the effective learning rate while Yogi does it in a controlled fashion. Improved empirical performance was often observed in the experiments described herein by adopting such a controlled increase in effective learning rate. Even in cases where rapid change in learning rate is desired, one can use Yogi with a smaller value of $\beta_2$ to mirror that behavior. Also, note that Yogi has the same O(d) computational and memory requirements as Adam, and is hence, efficient to implement.

Similar to Adam, the following convergence result for Yogi is provided in the non-convex setting.

Theorem 2 Let $\eta_t=\eta$ for all $t \in [T]$. Furthermore, assume that $\varepsilon$, $\beta_2$ and $\eta$ are chosen such that the following conditions satisfied:

$$1 - \beta_2 \leq \frac{\varepsilon^2}{16G^2}$$

and $$\eta \leq \frac{\varepsilon\sqrt{\beta_2}}{2L}.$$

Then for $x_t$ generated using Yogi (Algorithm 2), we have the following bound $$\mathbb{E}\|\nabla f(x_a)\|^2 \leq O\left(\frac{f(x_1) - f(x^*)}{\eta T} + \sigma^2\right),$$

where $x^*$ is an optimal solution to the problem in (1) and $x_a$ is an iterate uniformly randomly chosen from $\{x_1, \ldots, x_T\}$.

The convergence result is very similar to the result in Theorem 1. As before, the following results on bounded gradient norm with increasing batch size can be obtained as a simple corollary of Theorem 2.

Corollary 4 For $x_t$ generated using Yogi with constant $\eta$ (and parameters from Theorem 2), we have $$\mathbb{E}\left[\|\nabla f(x_a)\|^2\right] \leq O\left(\frac{1}{T} + \frac{1}{b}\right)$$

where $x_a$ is an iterate uniformly randomly chosen from $\{x_1, \ldots, x_T\}$.

Corollary 5 Yogi with $b=\Theta(T)$ and constant $\eta$ (and parameters from Theorem 2) has SFO complexity is $O(1/\delta^2)$ for achieving a $\delta$-accurate solution.

Example Discussion of Theoretical Results

The SFO complexity obtained here for Adam or Yogi with large batch size is similar to that of Sgd (see Corollary 1). While the theoretical results are stated with batch size $b=\Theta(T)$ for the sake of simplicity, similar results can be obtained for increasing minibatches $b_t=\Theta(t)$. In practice, a much weaker increase in batch size is sufficient. In fact, when the variance is not large, analysis shows that a reasonably large batch size can work well. Note that these are upper bounds and may not be completely reflective of the performance in practice. It is, however, instructive to note the relationship between different quantities of these algorithms in the results contained herein. In particular, the amount of adaptivity that can be tolerated depends on the parameter $\beta_2$. This convergence analysis is useful when $\varepsilon/G$ is large when compared to $1-\beta_2$ i.e., the adaptivity level is moderate. Note that here, the same bound $|[\nabla \ell(x,s)]_i| \leq G$ has been assumed across all coordinates $i \in [d]$ for simplicity, but the analysis can easily incorporate non-uniform bounds on gradients across coordinates. Recall that $\varepsilon$ here is only a parameter of the algorithm and is not associated with accuracy of the solution. Typically, it is often desirable to have small $\varepsilon$ in adaptive methods; however, limiting the adaptivity level to a certain extent almost always improves the performance (e.g. see Table 4 and 9, and FIG. 3). For this reason, the adaptivity level was set to a moderate value of $\varepsilon=10^{-3}$ for Yogi across all the experiments described in U.S. Provisional Patent Application No. 62/775,016.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, training data divided into a number of minibatches. The model trainer 160 can perform any of the optimization techniques described herein including, as examples, Algorithm 2 and method 200 of FIG. 2.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
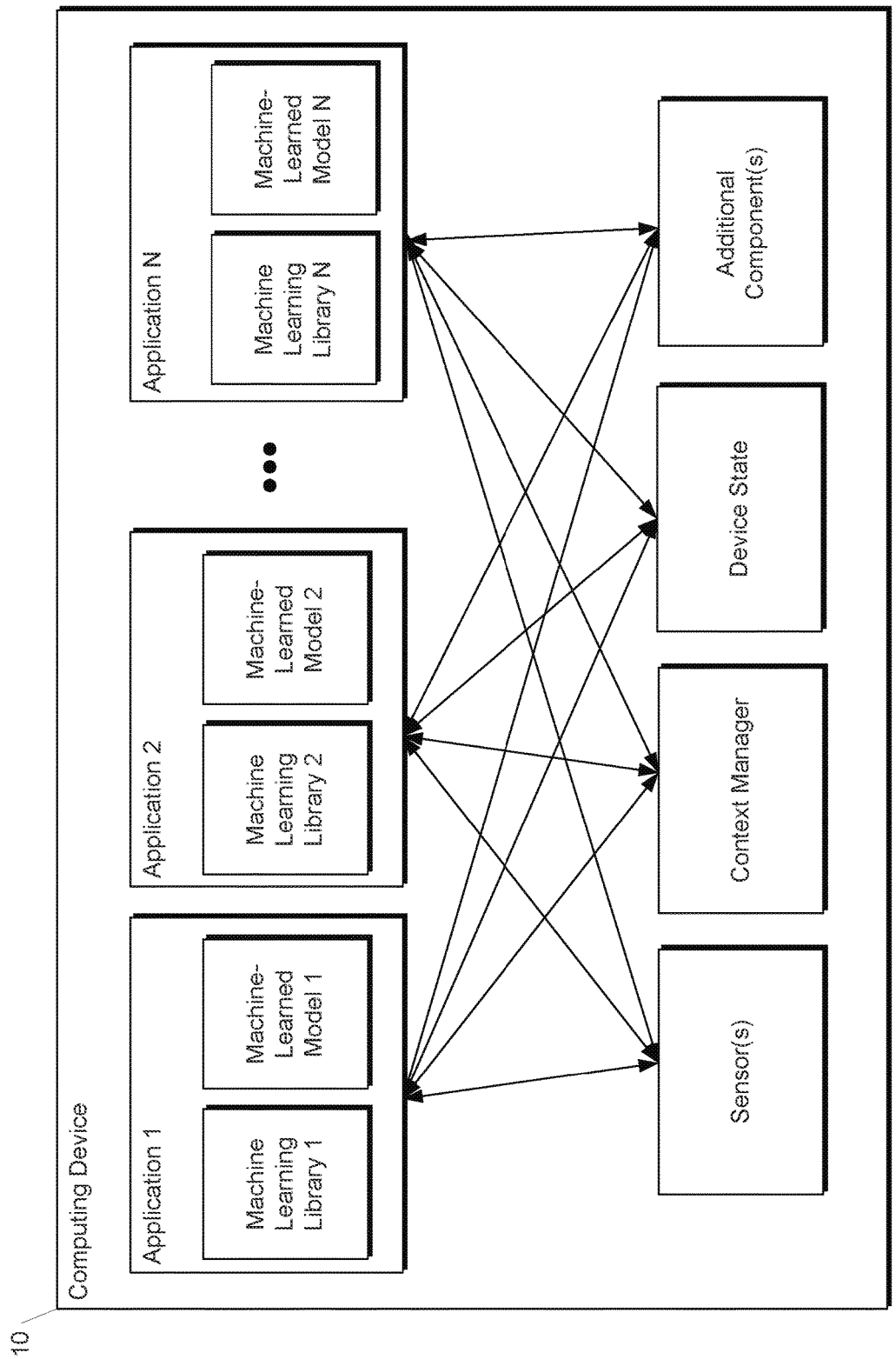
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
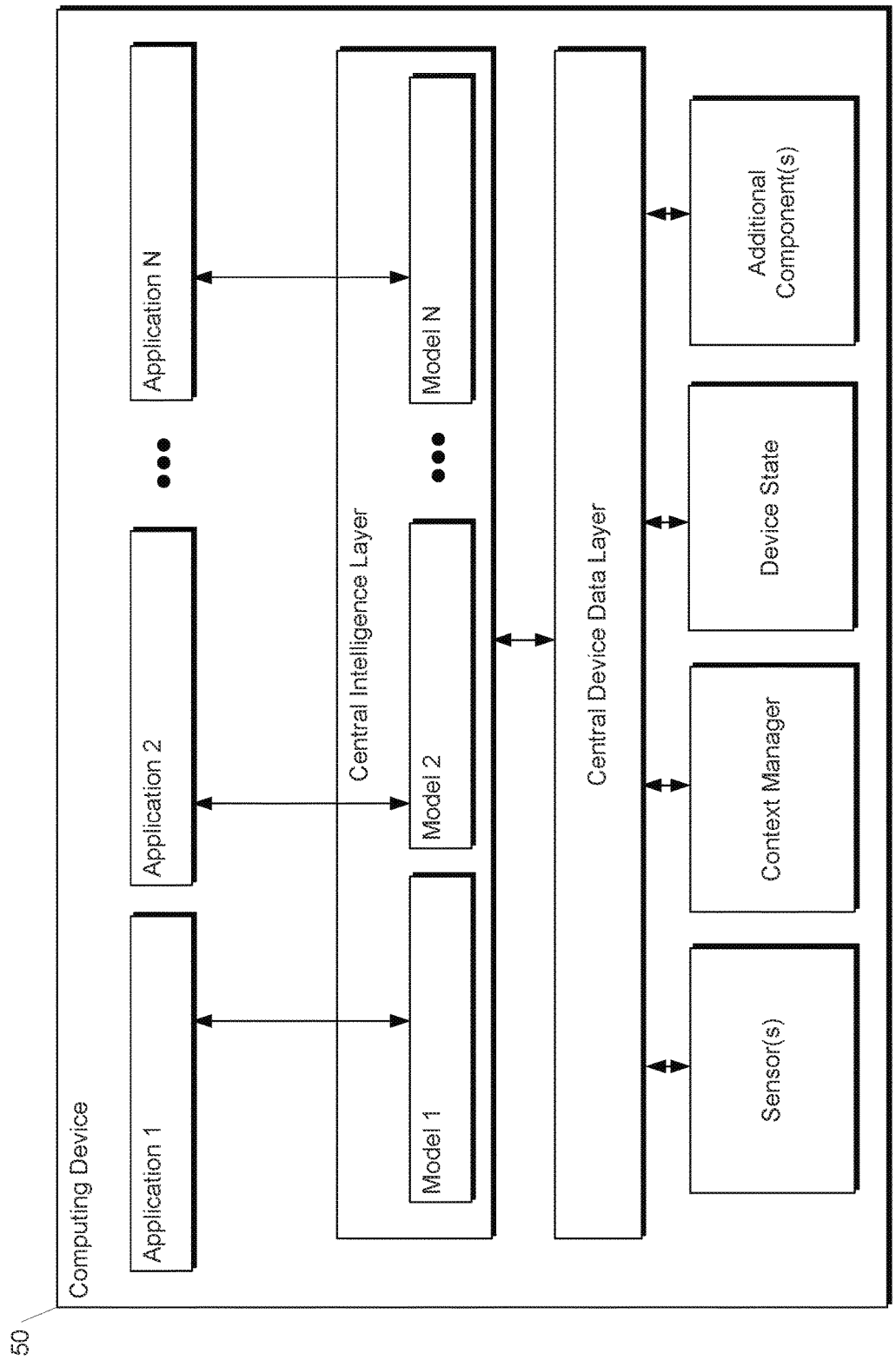
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2:
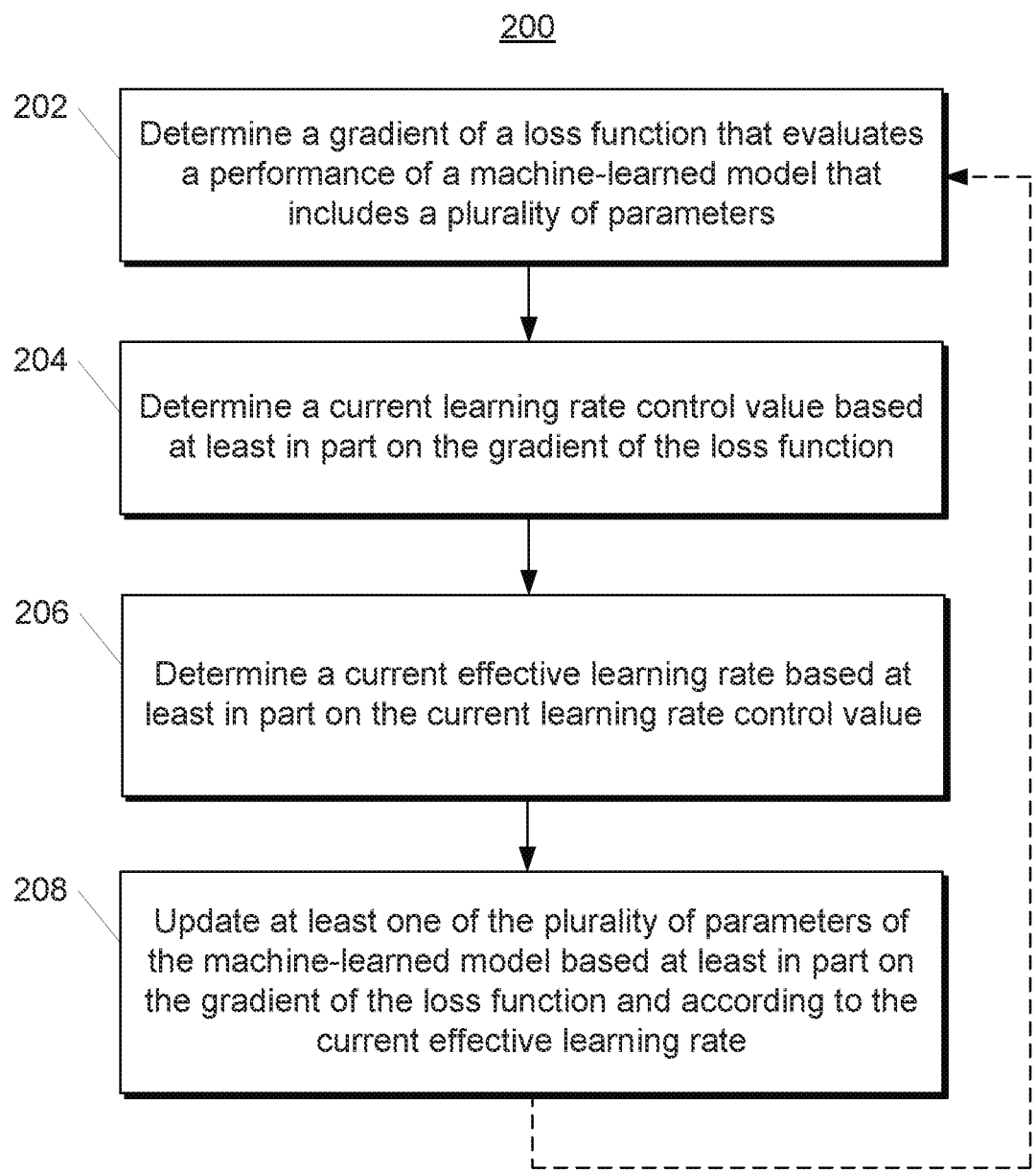
FIG. 2 depicts a flow chart diagram of an example method to train a machine-learned model according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can determine a gradient of a loss function that evaluates a performance of a machine-learned model that includes a plurality of parameters. For example, the machine-learned model can be any type of model including, for example, neural networks, support vector machines, decision tree-based models (e.g., random forest models), linear models, and/or various other types of machine-learned models.

At 204, the computing system can determine a learning rate control value based at least in part on the gradient of the loss function. For example, in some implementations, the current learning rate control value equals a most recent learning rate control value minus an update value. In some implementations, a magnitude of the update value can be a function of the gradient of the loss function but not the most recent learning rate control value. In some implementations, a polarity of the update value can be a function of both the gradient of the loss function and the most recent learning rate control value.

As an example, in some implementations, the update value can be based on a product of a square of the gradient of the loss function and a sign function applied to a difference between the most recent learning rate control value and the square of the gradient of the loss function and a product determined using a scaling coefficient.

For example, in some implementations, the update value can be equal to a square of the gradient of the loss function multiplied by a sign function applied to the most recent learning rate control value minus the square of the gradient of the loss function and multiplied by a scaling coefficient that is equal to one minus an update scaling parameter. In some implementations, the update scaling parameter can be held constant while, in other implementations, the update scaling parameter can be increased or decreased over time/number of iterations.

At 206, the computing system can determine a current effective learning rate based at least in part on the current learning rate control value. For example, the current effective learning rate can be a function of and inversely correlated to the current learning rate control value.

In some implementations, determining the current effective learning rate at 206 based at least in part on the current learning rate control value can include dividing a current learning rate by a square root of the current learning rate control value, optionally plus an adaptivity control value.

In at least some instances, it is possible that the polarity of the update value is positive such that the current learning rate control value is less than the most recent learning rate control value, whereby the current effective learning rate is greater than a most recent effective learning rate.

At 208, the computing system can update at least one of the plurality of parameters of the machine-learned model based at least in part on the gradient of the loss function and according to the current effective learning rate.

In some implementations, determining an updated set of values for the plurality of parameters of the machine-learned model based at least in part on the gradient of the loss function and according to the current effective learning rate can include: updating a current momentum value based at least in part on the gradient of the loss function and one or more previous momentum values respectively from one or more previous iterations; and determining, by the one or more computing devices, the updated set of values for the plurality of parameters of the machine-learned model based at least in part on the current momentum value and according to the current effective learning rate.

After 208, method 200 can optionally return to 202 and again determine a gradient of the loss function evaluated for the machine-learned model with respect to a different batch of training data. Thus, in some implementations, method 200 can be performed iteratively. The iterative loop can stop when one or more stopping criteria are met. The stopping criteria can be any number of different criteria including as examples, a loop counter reaching a predefined maximum, iteration over iteration change in parameter adjustments falling below a threshold, the gradient being below a threshold value, and/or various other criteria.

After the stopping criteria is met, method 200 can provide an optimized version of the machine-learned model as an output. The optimized version of the machine-learned model can include a final set of values for the plurality of parameters that were obtained at the final iteration of step 208.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the present disclosure are directed to methods, computer systems, and non-transitory computer-readable media. One aspect is directed to a computer system configured to perform any of the methods described herein, such as a computing system configured to perform any of the methods described in any of the claims. Another aspect is directed to a non-transitory computer-readable medium storing instructions for performing any of the methods described herein, such as instructions for performing any of the methods described in any of the claims. Likewise, another aspect is directed to computer-implemented methods for performing any of the operations or instructions described herein such as any of the operations or instructions described in any of the claims.

The technology described herein has a number of possible applications or uses. As one example, it has been shown that aspects of the present disclosure can be used to train models for performance of vision tasks, for example where the inputs to the model (e.g., neural network) are images or features that have been extracted from images and the output generated by the model (e.g., neural network) for a given image may be scores for each of a set of object categories, with each score representing an estimated likelihood that the image contains an image of an object belonging to the category. It will, however, be appreciated that aspects can be used to generate models (e.g., neural networks) that are configured to receive any kind of digital data input and to generate any kind of score, classification, or regression output based on the input. For example, if the inputs to the model (e.g., neural network) are Internet resources (e.g., web pages), documents, or portions of documents or features extracted from Internet resources, documents, or portions of documents, the output generated by the model (e.g., neural network) for a given Internet resource, document, or portion of a document may be a score for each of a set of topics, with each score representing an estimated likelihood that the Internet resource, document, or document portion is about the topic. As another example, if the inputs to the model (e.g., neural network) are features of a personalized recommendation for a user, e.g., features characterizing the context for the recommendation, e.g., features characterizing previous actions taken by the user, the output generated by the model (e.g., neural network) may be a score for each of a set of content items, with each score representing an estimated likelihood that the user will respond favorably to being recommended the content item. As another example, if the input to the model (e.g., neural network) is a sequence of text in one language, the output generated by the model (e.g., neural network) may be a score for each of a set of pieces of text in another language, with each score representing an estimated likelihood that the piece of text in the other language is a proper translation of the input text into the other language. As another example, if the input to the model (e.g., neural network) is a sequence of text, the output generated by the model (e.g., neural network) may be a score for each of a set of pieces of text, with each score representing an estimated likelihood that the piece of text should follow the input text. As another example, if the input to the model (e.g., neural network) is a sequence representing a spoken utterance, the output generated by the model (e.g., neural network) may be a score for each of a set of pieces of text, each score representing an estimated likelihood that the piece of text is the correct transcript for the utterance.

Thus, in various examples, the training examples may be text, audio such as spoken utterances, images, video, or atomic position and/or connection data, and, as one example, the training classification model may output a score or classification for this data which can be compared to a ground truth score or classification. Thus a machine-learned model processed in accordance with the techniques described herein may be part of: a speech synthesis system; an image processing system; a video processing system; a dialogue system; an autocompletion system; a text processing system; and a drug discovery system.

What is claimed is:

1. A computing system for utilization of a machine-learned model that is optimized via adaptive learning, the computing system comprising:
one or more processors;
an optimized machine-learned model comprising a plurality of optimized parameters, wherein the plurality of optimized parameters have been optimized over a plurality of iterations based at least in part on a gradient of a loss function and an effective learning rate, wherein the effective learning rate is based at least in part on a current learning rate control value that equals a recent learning rate control value minus an update value, wherein a magnitude of the update value is a function of the gradient of the loss function, wherein a polarity of the update value is a function of both the gradient of the loss function and the recent learning rate control value, and wherein, for at least one of the plurality of iterations, the polarity of the update value is positive such that the current learning rate control value is less than the most recent learning rate control value, whereby the current effective learning rate is greater than a most recent effective learning rate; and
one or more tangible, non-transitory computer readable media storing computer-readable instructions that when executed by the one or more processors cause the one or more processors to perform operations, the operations comprising:
obtaining input data for the optimized machine-learned model; and
processing the input data using the optimized machine-learned model to obtain optimized output data.

2. The computing system of claim 1, wherein the operations further comprise:
performing one or more actions based at least in part on the optimized output data.

3. The computing system of claim 1, wherein the operations further comprise:
evaluating the loss function, wherein the loss function is configured to evaluate a difference between the optimized output data and a ground truth label associated with the input data.

4. The computing system of claim 3, wherein the operations further comprise:
determining a second learning rate control value based at least in part on the gradient of the loss function, wherein the second learning rate control value equals the current learning rate control value minus a second update value, wherein a magnitude of the second update value is a function of the gradient of the loss function, and wherein a polarity of the second update value is a function of both the gradient of the loss function and the current learning rate control value;
determining a second effective learning rate based at least in part on the second learning rate control value; and
determining an updated set of values for the plurality of optimized parameters of the optimized machine-learned model based at least in part on the loss function and according to the second effective learning rate.

5. The computing system of claim 4, wherein the polarity of the second update value is positive such that the second learning rate control value is less than the current learning rate control value, whereby the second effective learning rate is greater than the effective learning rate.

6. The computing system of claim 4, wherein the second update value is equal to a square of the gradient of the loss function multiplied by a sign function applied to the current learning rate control value minus the square of the gradient of the loss function and multiplied by a scaling coefficient that is equal to one minus an update scaling parameter.

7. The computing system of claim 1, wherein the optimized output data comprises an output for a task, and wherein the task comprises:
an image analysis task;
a predictive task; or
a classification task.

8. The computing system of claim 7, wherein:
the task comprises the image analysis task;
the input data comprises image data that depicts one or more objects; and
the optimized output data comprises a descriptive annotation of at least one of the one or more objects.

9. The computing system of claim 7, wherein:
the task comprises a classification task;
the input data comprises data descriptive of an entity; and
the optimized output data comprises a classification of the entity.

10. The computing system of claim 7, wherein:
the task comprises a prediction task;
the input data comprises sensor data from one or more sensors; and
the optimized output data comprises a decision.

11. A process for production of an optimized machine-learned model product trained using an adaptive learning algorithm with improved convergence properties and stored on one or more tangible, non-transitory computer readable media, wherein the process comprises the steps of:
(a) for a plurality of iterations:
determining a gradient of a loss function that evaluates a performance of a machine-learned model, wherein the machine-learned model comprises a plurality of parameters;
determining a current learning rate control value based on the gradient of the loss function, wherein the current learning rate control value equals a most recent learning rate control value minus an update value, wherein a magnitude of the update value is a function of the gradient of the loss function but not the most recent learning rate control value, and wherein a polarity of the update value is a function of both the gradient of the loss function and the most recent learning rate control value; and
determining an updated set of values for the plurality of parameters of the machine-learned model based at least in part on the gradient of the loss function and according to the current effective learning rate;
wherein, for at least one of the plurality of iterations, the polarity of the update value is positive such that the current learning rate control value is less than the most recent learning rate control value, whereby the current effective learning rate is greater than a most recent effective learning rate; and
(b) storing the optimized machine-learned model product on the one or more tangible, non-transitory computer readable media, wherein the optimized machine-learned model product comprises an optimized version of the machine-learned model.

12. The process according to claim 11, wherein the update value is equal to a square of the gradient of the loss function multiplied by a sign function applied to the most recent learning rate control value minus the square of the gradient of the loss function and multiplied by a scaling coefficient that is equal to one minus an update scaling parameter.

13. The process according to claim 11, wherein determining the current effective learning rate based at least in part on the current learning rate control value comprises dividing a current learning rate by a square root of the current learning rate control value plus an adaptivity control value.

14. The process according to claim 11, wherein, for at least one of the plurality of iterations, the polarity of the update value is positive such that the current learning rate control value is less than the most recent learning rate control value, whereby the current effective learning rate is greater than a most recent effective learning rate.

15. A computer-implemented method for utilization of a machine-learned model that is optimized via adaptive learning, comprising:
obtaining, by a computing system comprising one or more computing devices, input data for an optimized machine-learned model, wherein the optimized machine-learned model comprises a plurality of optimized parameters, wherein the plurality of optimized parameters have been optimized over a plurality of iterations based at least in part on a gradient of a loss function and an effective learning rate, wherein the effective learning rate is based at least in part on a current learning rate control value that equals a recent learning rate control value minus an update value, wherein the update value is equal to a square of the gradient of the loss function multiplied by a sign function applied to the recent learning rate control value minus the square of the gradient of the loss function and multiplied by a scaling coefficient that is equal to one minus an update scaling parameter; and
processing, by the computing system, the input data using the optimized machine-learned model to obtain optimized output data.

16. The computer-implemented method of claim 15, wherein the method further comprises:
performing, by the computing system, one or more actions based at least in part on the optimized output data.

17. The computer-implemented method of claim 15, wherein the method further comprises:
evaluating, by the computing system, the loss function, wherein the loss function is configured to evaluate a difference between the optimized output data and a ground truth label associated with the input data.

18. The computer-implemented method of claim 15, wherein the effective learning rate is inversely correlated to the current learning rate control value.

19. The computer-implemented method of claim 15, wherein, for at least one of the plurality of iterations, a polarity of the update value is positive such that the current learning rate control value is less than the recent learning rate control value, whereby the effective learning rate is greater than the recent effective learning rate.

20. The computer-implemented method of claim 15, wherein, over the plurality of iterations, the update scaling parameter is held constant or increased.

* * * * *